UNITED STATES PATENT OFFICE.

MORITZ HERZOG, OF HOBOKEN, NEW JERSEY.

FINING COMPOSITION.

SPECIFICATION forming part of Letters Patent No. 341,239, dated May 4, 1886.

Application filed February 20, 1886. Serial No. 192,661. (No specimens.)

*To all whom it may concern:*

Be it known that I, MORITZ HERZOG, of Hoboken, in the county of Hudson and State of New Jersey, have invented certain new and useful Improvements in Fining Compositions, of which the following is a specification.

This invention relates to an improved fining composition to be used as a substitute for all kinds of isinglass in the fining of beer, ale, cider, wine, and other fermented liquids; and the invention consists of a fining composition formed of a mixture of pulverized salep and a suitable acid.

In preparing my improved fining composition the roots of salep (*Orchis mascula, Orchis Morio, Orchis militaris Linn.*) are pulverized and one hundred parts in weight of the same mixed with from two to six per cent. in weight of a suitable acid—such as tartaric acid, salicylic acid, benzoic acid, phosphoric acid, &c. I prefer to use salicylic acid, as thereby the fermented liquids are also preserved for a certain length of time. The mixture of pulverized salep and acid is dissolved in hot water, the acid facilitating and accelerating the solution of the salep in water. The fining solution is then added to the liquid to be fined. The albuminous and glutinous substances in the same are then precipitated in the usual manner by adding from two to ten per cent. in weight of tannic acid to the liquid.

The advantage of my improved fining composition as compared to the different kinds of isinglass heretofore in use consists, mainly, in the quick and easy solution of the fining composition in hot water, and, secondly, of the quick fining action by the glutinous ingredients contained in the salep and the quick settling of the albuminous and glutinous substance by the action of the tannic acid, while a preservative influence is exerted on the liquid when benzoic or salicylic acid has been used in preparing the fining composition.

I am aware that finings composed of isinglass, sulphurous acid, and water, also a fining composition consisting of a mixture of gelatine prepared from skins and salicylic acid have been used heretofore, and I lay no claim to the same.

Having thus described my invention, I claim as new and desire to secure by Letters Patent—

1. A fining composition consisting of a mixture of pulverized salep and a suitable acid, substantially as set forth.

2. A fining composition consisting of a mixture of pulverized salep and a preservative acid, substantially as set forth.

In testimony that I claim the foregoing as my invention I have signed my name in presence of two subscribing witnesses.

MORITZ HERZOG.

Witnesses:
 PAUL GOEPEL,
 SIDNEY MANN.